Aug. 5, 1958     C. G. GRAEF ET AL     2,845,681
HOSE CLAMP
Filed Jan. 12, 1953
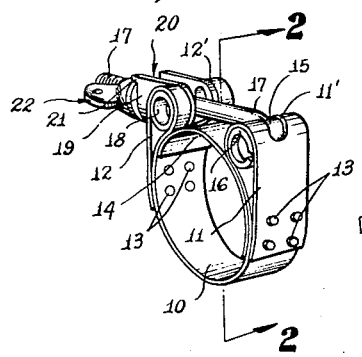
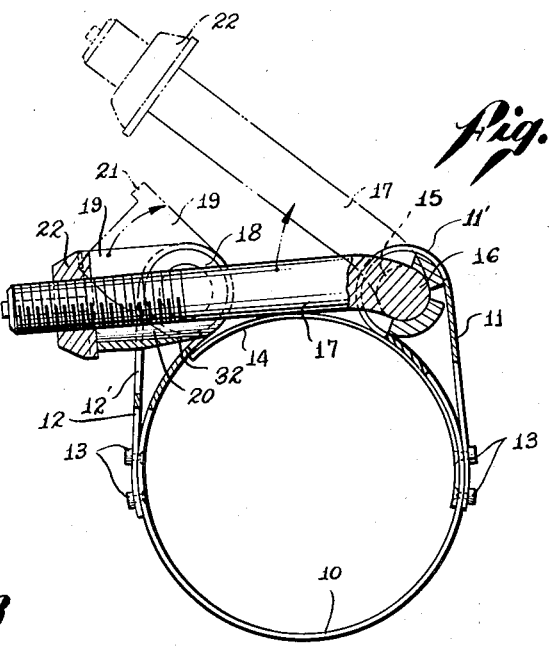
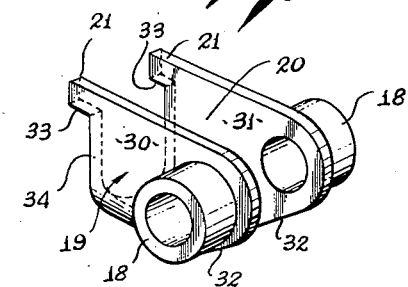
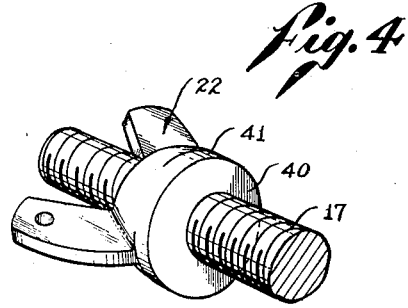
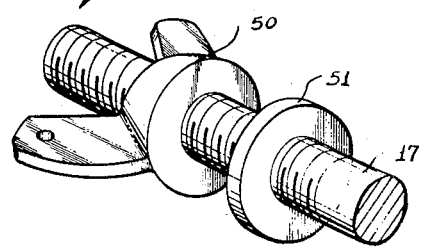
INVENTORS
CHARLES G. GRAEF
THOMAS FISHER
BY
*Attorney*

United States Patent Office 2,845,681
Patented Aug. 5, 1958

2,845,681

HOSE CLAMP

Charles G. Graef, Downey, and Thomas Fisher, Torrance, Calif., assignors to O & M Machine Company, Inc., Los Angeles, Calif., a corporation of California Application January 12, 1953, Serial No. 330,802

1 Claim. (Cl. 24—279)

This invention relates generally to hose clamps of the flexible band type, and more particularly to quick connect and disconnect devices for such hose clamps.

A primary object of the invention is the provision of a hose clamp having an improved quick connect and disconnect device.

A more particular object is to provide an improved clamp which includes, inseparable therefrom, all necessary preformed parts whereby, a conventional nut may be used to effect the locking action and the necessity of maintaining special preformed parts in stock is avoided.

Still another object is to provide such a clamp that is simple and inexpensive yet fully effective and reliable.

The clamp of the invention utilizes the conventional flexible metal strap or band having slotted loops formed at its ends. The head of a simple T bolt is pivotally mounted in one of these loops, the shank of the bolt protruding through the slot in the loop. A cooperating trunnion member is pivotably mounted in the other loop, and includes an elongated longitudinally channeled bolt guide, which extends through the slot in said loop. The shank of the T bolt is receivable into the channel of this bolt guide, the end portion projecting beyond the end of the bolt guide. A screw threaded fastening means in the form of a nut, sometimes including a washer ahead of the nut, is threaded onto the end of the bolt shank and is set against the end of the bolt guide to exert clamping pressure. To disconnect the hose clamp, this nut is backed off a few turns, and the bolt shank then swung upwardly out of its channel in the bolt guide.

The end of the bolt guide is provided with projections co-acting with the fastening means on the bolt shank to properly laterally position the shank and prevent outward displacement thereof relative to a bolt guide when the fastening means is set in clamping position.

A better understanding of the invention and its various features and advantages will be had by referring to the following detailed description taken in conjunction with the accompanying drawings in which:

Figure 1 is a perspective view of a preferred embodiment of the hose clamp;

Fig. 2 is a view partly in section as seen along the lines 2—2 of Fig. 1;

Fig. 3 is a perspective view of the trunnion member;

Fig. 4 is an enlarged perspective view of the T bolt shank and cooperating nut; and Fig. 5 is an enlarged perspective view of a different embodiment of the nut and engaging means.

Referring to Fig. 1 the hose clamp is shown as comprising a flexible strap 10 bent into a hose engaging circle and having its ends doubled back to form loops 11 and 12. The extreme ends of the strap are riveted to the strap as by rivets 13, for example. A tongue element 14 in the form of a flexible strip is also held beneath the loop 11 by means of the rivets 13 but is in sliding engagement with the lower portion of the loop 12 as shown. A longitudinal slot 11' is cut transversely of the axis of loop 11. Similarly a longitudinal slot 12' is cut transversely of the axis of loop 12.

Pivotally mounted in the loop 11 is the cylindrical head 15 of a T bolt 16 having a shank 17 protruding through the slot 11'. The T bolt may thus be arcuately swung around the loop axis to the position indicated in phantom lines in Fig. 2.

The loop 12 similarly pivotally mounts a trunnion member having oppositely extending trunnions 18 and an elongated U-shaped bolt guide 19 defining an open channel 20, the bolt guide passing through the slot 12' and its channel extending in a direction substantially the same as that of the shank 17 of the T bolt when the elements are in assembled position.

As shown more clearly in Fig. 3 the bolt guide 19 comprises two side walls 30 and 31 to the exteriors of which the trunnions 18 are secured. Those walls may be formed by bending a blank of metal into a U shape, the walls forming the legs of the U and defining the bolt receiving channel 20. The rear end of each wall below the trunnions may be undercut as at 32 so that the trunnion member may be seated properly on the engaging strap 10 and permit the channel to be axially alined with the shank of the T bolt.

The front upper end of each wall 30 and 31 includes a projection 21 integral with the wall but having a downwardly directed bearing surface or shoulder 33. With this construction, advancement of the nut 22 on the end of the bolt shank with the shank positioned so that the projections 21 overlie the periphery of the nut assures positioning of the shank at the proper depth in the bolt guide, and the engaging face of the nut exerts clamping force on the engaging end face 34 of the U-shaped bolt guide.

Fig. 4 shows an enlarged view of the wing nut 22 threaded on the end of the shank 17. As shown, the face 40 of the nut 22 is adapted to engage the U-shaped end face 34 (Fig. 3) of the bolt guide 19, and includes a substantially smooth peripheral surface 41 which underlies the projections 21 on the bolt guide.

Attention is directed to the fact that, with the nut and shank 17 thus properly positioned within the bolt guide channel by the shoulders 33, the longitudinal axis of shank 17 passes slightly below the axis of the trunnions 18 when the clamp has been tightened, so that the clamping pressure exerted by the nut tends to swing the elongated bolt guide inward above the trunnions, rather than outward. To apply the clamp, the strap 10 is placed about a hose to be clamped and the shank member 17 of the T bolt swung down into the channel 20 of the bolt guide, the bolt guide being swung inwardly to the full line position of Fig. 2. The nut 22 is then advanced on the threaded shank member until it abuts against the end 34 of the bolt guide, the overlying projections 21 serving to position the shank at the proper depth within the bolt guide. The elongated bolt guide having been pressed or swung inwardly, as to the position shown in full lines on Fig. 2, the nut 22 is then further tightened, and because of the positioning of the shank by the shoulders 33 so that the axis of the shank passes below the axis of the trunnions, such tightening causes the elongated bolt guide to swing slightly inward on its trunnions. In the finally tightened position, therefore, the tendency is for the elongated bolt guide to swing inward rather than outward, thus safeguarding against accidental release of the clamp by passage of the shank outward of the open bolt guide channel. To release the clamp, the nut 22 is backed off a few turns, whereupon the elongated bolt guide can then be swung outward, as to the phantom line position of Fig. 2, thus releasing the shank. The clamp may thus be removed without actually separating any of its components.

Fig. 5 shows an enlarged view of a different nut 50 which, due to the winged portion thereof, may not be readily engaged by the projections 21 of the trunnion member due to the possibility of the wing portions of the nut striking the projections as the nut is threaded into position. In this event any ordinary washer 51 may be first placed on the shank 17 to engage the end 34 of the bolt guide and the nut 50 then urged up against the washer element 51. The downwardly directed surfaces 33 of the projections 21, will then engage in locking fashion the washer 51.

It is to be noted that the only parts that are completely removable from the hose clamp are the nut and washer 51 which parts are standard. In the embodiment of Figs. 1, 2 and 4, however, only the nut can be completely separated and since this is generally a standard component, there is no need for an extra supply of preformed parts.

Modifications within the spirit of the present invention will occur to those skilled in the art. The hose clamp is therefore not to be thought of as limited to the precise embodiment disclosed.

We claim:

In a hose clamp, a flexible strap adapted to encircle a work member; a T-bolt having a head pivotally mounted on said strap adjacent one end thereof, and a threaded shank; an elongated bolt guide and trunnion member comprising a pair of trunnions projecting oppositely from opposite sides of one end of an elongated substantially U-shaped bolt guide, said trunnions pivotally mounted on said strap adjacent the other end thereof, said elongated U-shaped bolt guide defining a deep open channel between said trunnions and extending from end-to-end of the guide, said channel being adapted to receive the T-bolt shank when the strap is bent into a hose-encircling circle, clamp tightening means including a threaded element adjustably positioned on the threaded end portion of said T-bolt shank for engaging the free end of the trunnioned U-shaped bolt guide, said free end of said U-shaped guide comprising a seat for said tightening means formed at right angles to the bolt guide channel and a projecting lug at the top of each side of the U-shaped guide forming a downwardly facing shoulder which engages over said tightening means, said shoulders being so located as to position said fastening means and said shank relative to the U-shaped guide such that the longitudinal axis of said shank passes said trunnions at least as near to the strap as the location of the trunnion axis, whereby tendency of the elongated bolt guide to swing outwardly when the tightening means is set up is avoided.

References Cited in the file of this patent

UNITED STATES PATENTS

| 911,840 | Reid | Feb. 9, 1909 |
| 991,769 | Catelain | May 9, 1911 |
| 2,489,535 | Montague | Nov. 29, 1949 |

FOREIGN PATENTS

| 4,974 | Great Britain | 1909 |
| 19,971 | Australia | May 10, 1930 |
| 456,911 | Great Britain | Nov. 18, 1936 |